(12) United States Patent
Ly et al.

(10) Patent No.: US 12,418,901 B2
(45) Date of Patent: Sep. 16, 2025

(54) CARRIER GROUP SIGNALING IN INTER-BAND CARRIER AGGREGATION

(71) Applicant: QUALCOMM Incorporated, San Diego, CA (US)

(72) Inventors: Hung Dinh Ly, San Diego, CA (US); Peter Gaal, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 556 days.

(21) Appl. No.: 17/807,364

(22) Filed: Jun. 16, 2022

(65) Prior Publication Data

US 2023/0413248 A1    Dec. 21, 2023

(51) Int. Cl.
*H04W 72/04* (2023.01)
*H04W 72/0453* (2023.01)

(52) U.S. Cl.
CPC .............. *H04W 72/0453* (2013.01)

(58) Field of Classification Search
CPC .................................. H04W 72/0853
See application file for complete search history.

(56) References Cited

U.S. PATENT DOCUMENTS

| | | | |
|---|---|---|---|
| 2019/0239245 A1* | 8/2019 | Davydov | H04L 5/0048 |
| 2020/0112984 A1* | 4/2020 | Islam | H04L 5/001 |
| 2023/0379116 A1* | 11/2023 | Abotabl | H04L 5/0091 |
| 2023/0388094 A1* | 11/2023 | Ly | H04W 56/001 |

* cited by examiner

*Primary Examiner* — Brenda H Pham
(74) *Attorney, Agent, or Firm* — Dinsmore & Shohl LLP

(57) ABSTRACT

Certain aspects of the present disclosure provide techniques for performing wireless communications. In one aspect, a method of wireless communications by a user equipment (UE) includes performing wireless communications with a network entity using an inter-band aggregated carrier group, wherein: the inter-band aggregated carrier group comprises at least a first carrier on a first band and a second carrier on a second band, the first carrier comprises a synchronization signal block, and the second carrier does not comprise any synchronization signal block.

16 Claims, 11 Drawing Sheets

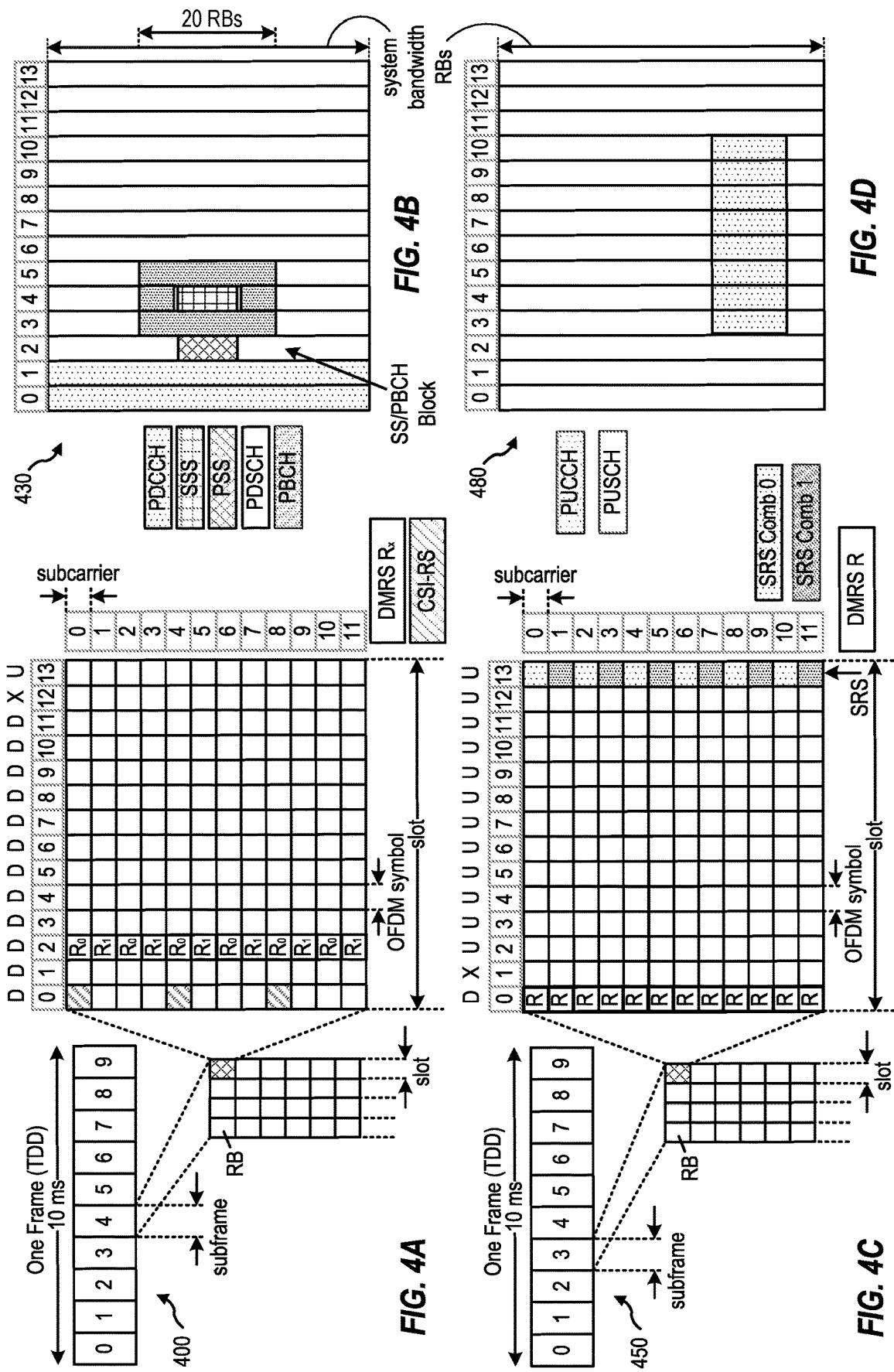

CARRIER GROUP SIGNALING IN INTER-BAND CARRIER AGGREGATION

BACKGROUND

Field of the Disclosure

Aspects of the present disclosure relate to wireless communications, and more particularly, to techniques for carrier group signaling in inter-band carrier aggregation.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communications by a user equipment (UE). The method includes performing wireless communications with a network entity using an inter-band aggregated carrier group, wherein: the inter-band aggregated carrier group comprises at least a first carrier on a first band and a second carrier on a second band, the first carrier comprises a synchronization signal block, and the second carrier does not comprise any synchronization signal block.

Another aspect provides a method of wireless communications by a network entity. The method includes performing wireless communications with a UE using an inter-band aggregated carrier group, wherein: the inter-band aggregated carrier group comprises at least a first carrier on a first band and a second carrier on a second band, the first carrier comprises a synchronization signal block, and the second carrier does not comprise any synchronization signal block.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Figure 1:
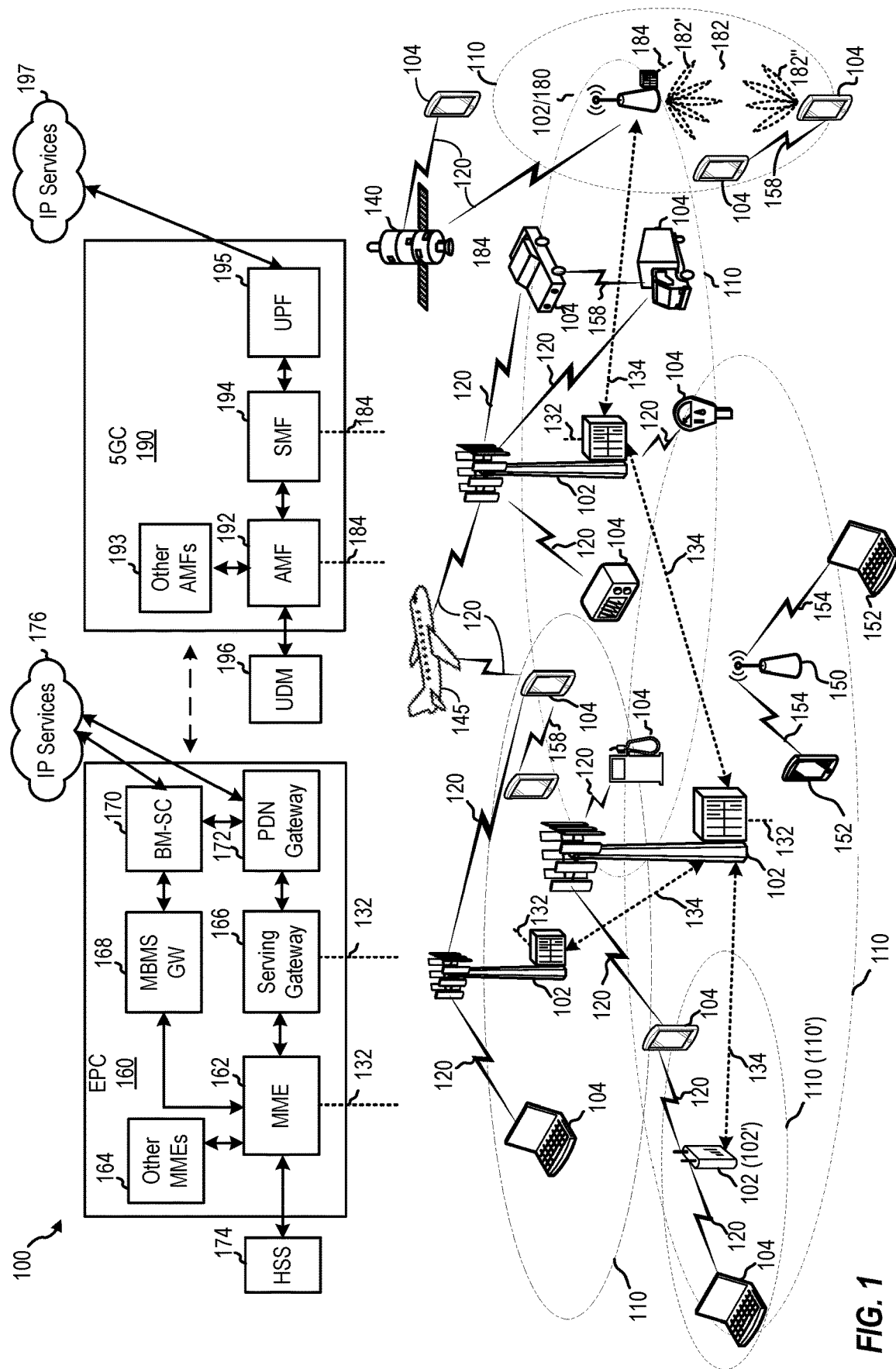
FIG. 1 depicts an example wireless communications network.

Aspects of the present disclosure provide apparatuses, methods, processing systems, and computer-readable mediums for carrier group signaling in inter-band carrier aggregation.

Wireless communications systems provide myriad essential services in modern life. However, as the capabilities and deployments of wireless communications systems has expanded, so too has the energy use and associated costs of operation of such wireless communications systems. For example, recent research estimates that energy consumption may account for nearly one-quarter of the cost of running a wireless communications system, and as much as half of the energy consumption consumed by a wireless communications system is by the radio access network (RAN). Consequently, methods for improving the energy efficiency of wireless communications systems, especially the RAN, along with their capabilities, are desirable.

Wireless communications systems may generally deploy services using one or more wireless "carriers", e.g., component carriers or supplemental uplink (SUL) carriers, which may be defined by a particular radio frequency or range of frequencies upon which to perform wireless communications. Conventionally, wireless communications systems may deploy carriers in structured ways, such as by having recurrent broadcasts of data that is useful for users of the wireless communications system. One such example is the recurrent broadcast of synchronization signal blocks (SSBs) and system information (SI), which are used by user equipments for various network functions, such as random access procedures (e.g., RACH procedures). By their recurrent nature, such broadcasts may consume unnecessary energy when there are no user equipments receiving and using the broadcasted information at given time. However, because it is generally challenging to know when a user equipment will need such broadcasts, given the dynamic nature of many user equipments in a wireless communications systems, the broadcasts are conventionally made on schedule regardless of anticipated use.

Carrier aggregation is a technique that is used in wireless communication to increase the data rate per user equipment, whereby multiple frequency blocks (e.g., multiple component carriers) are assigned to the same user equipment. The different component carriers may be used to enhance the performance of a single application, or be used to support multiple concurrent applications on the user equipment. Generally, aggregating carriers may beneficially enhance throughput and support more data-intensive applications in user equipments.

Conventionally, each carrier in an aggregated carrier configuration may still have its own recurrent information broadcasts, such as SSBs and SI broadcasts. However, when a user equipment is using aggregated carriers, it may not need SSBs and SI across all of the aggregated carriers. For example, the user equipment may be able to perform timing and synchronization using a single carrier of the aggregated carriers and apply that timing and synchronization to the other aggregated carriers.

However, while timing and synchronization information (as one example) may be applicable across aggregated carriers within a frequency band, so-called intra-band aggregated carriers, a technical problem arises when trying to utilize timing and synchronization information (and other signal and channel characterization data) with carriers aggregated across different frequency bands, so-called inter-band aggregated carriers. This is because carriers aggregated across different frequency bands may have very different signal and channel characteristics. Consequently, it is desirable for a user equipment and a network to have a common understanding of which carrier within an aggregated carrier group the user equipment will use for time and frequency information (e.g., by way of receiving SSBs) when the user equipment is also communicating on aggregated carriers that do not include SSB and/or SI broadcasts.

Aspects described herein provide techniques for signaling and configuring inter-band aggregated carriers (e.g., inter-band carrier aggregation) so that user equipments may beneficially make use of aggregated carrier groups in which some carriers do not broadcast (or broadcast less frequently) recurrent information, such as SSB and/or SI broadcasts. These aspects beneficially enable wider use of carrier aggregation (e.g., inter-band carrier aggregation) while also enabling the energy saving benefits of carriers that do not do not broadcast (or broadcast less frequently) recurrent information. Thus, both capability and energy savings are achieved based on the aspects described herein.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
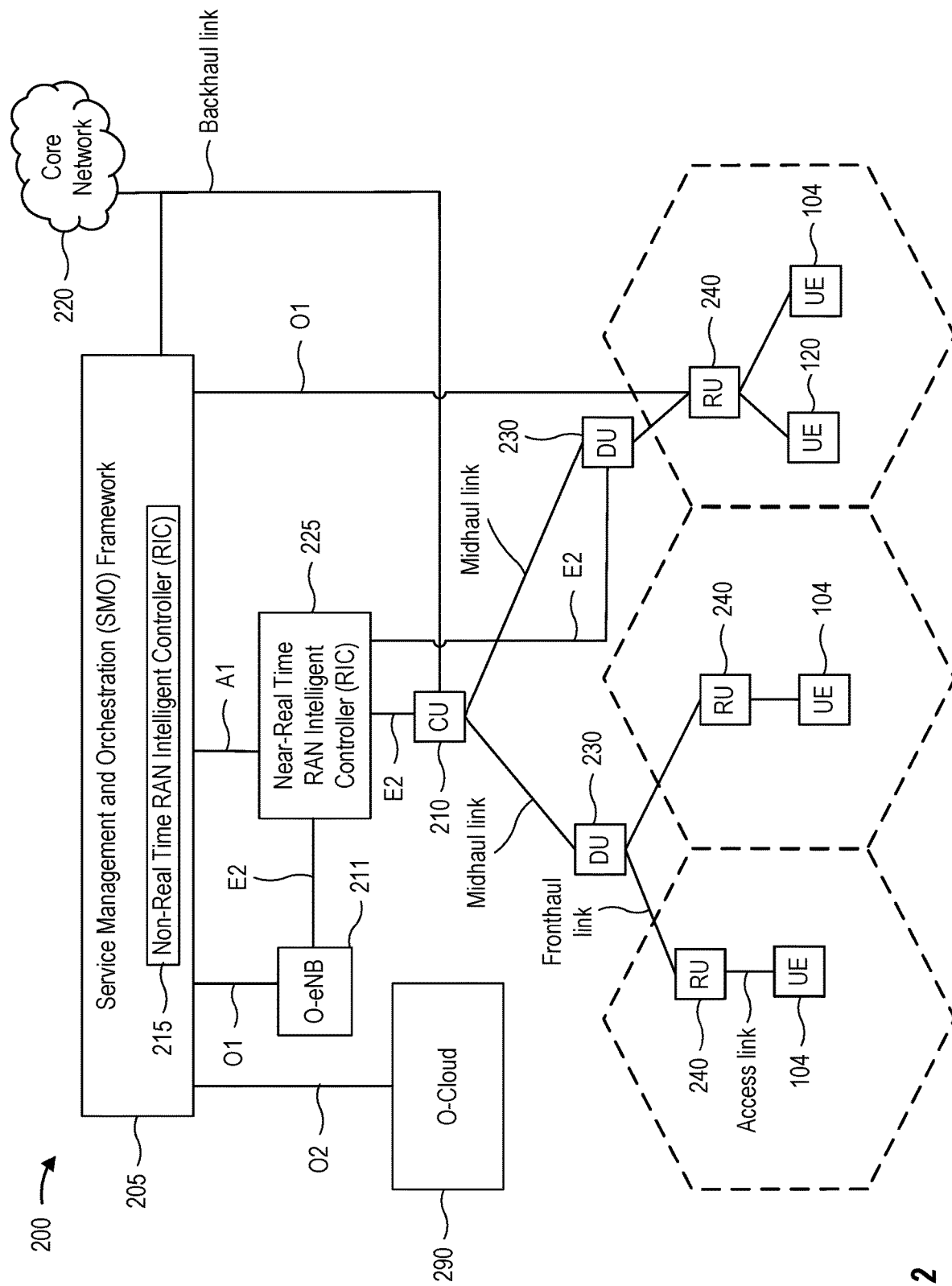
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as AI policies).

Figure 3:
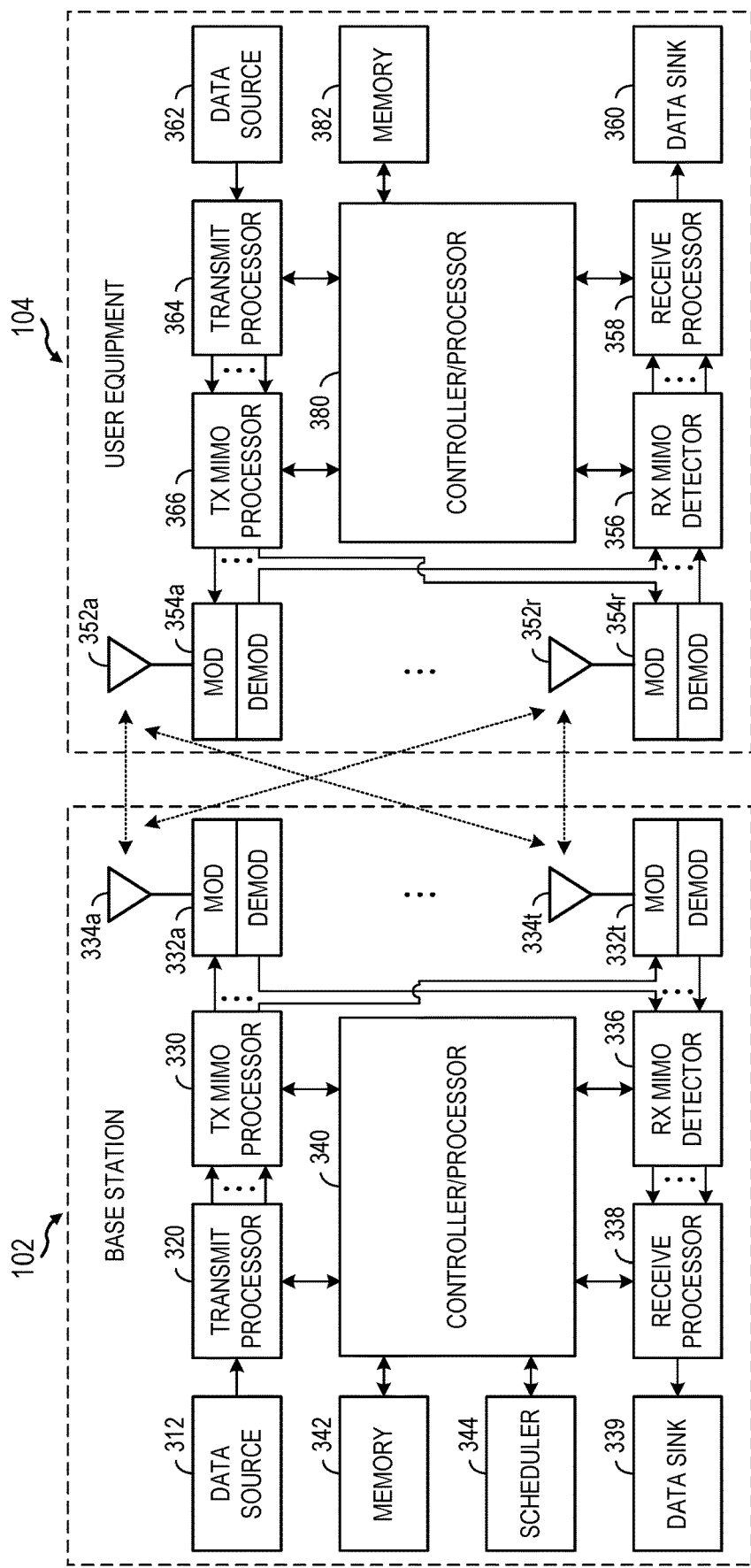
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Carrier Group Signaling In Inter-Band Carrier Aggregation Aspects described herein provide techniques for signaling and configuring inter-band aggregated carriers. In particular, aspects described herein enable inter-band carrier aggregation where one or more carriers in a set of inter-band aggregated carrier groups do not include SSB and other broadcast channel transmission e.g., system information (SI) broadcasts.

In various aspects, a network may configure one or more aggregated carrier groups in which, within each group, there is only one carrier that includes SSB and/or SI broadcasts and all other carriers within that group do not include SSB and/or SI broadcasts. The inter-band carrier aggregation configuration may generally identify the carrier within the aggregated carrier group that includes the SSB and/or SI broadcasts so that a user equipment being configured for the inter-band carrier aggregation knows which carrier to use for receiving the SSB and/or SI broadcasts. Beneficially, the carriers in an aggregated carrier group that are not configured with SSB and/or SI broadcasts, need not wake up regularly (e.g., every 20 ms) to transmit such broadcasts, thereby saving network energy while nevertheless enabling network performance through carrier aggregation.

Figure 5A:
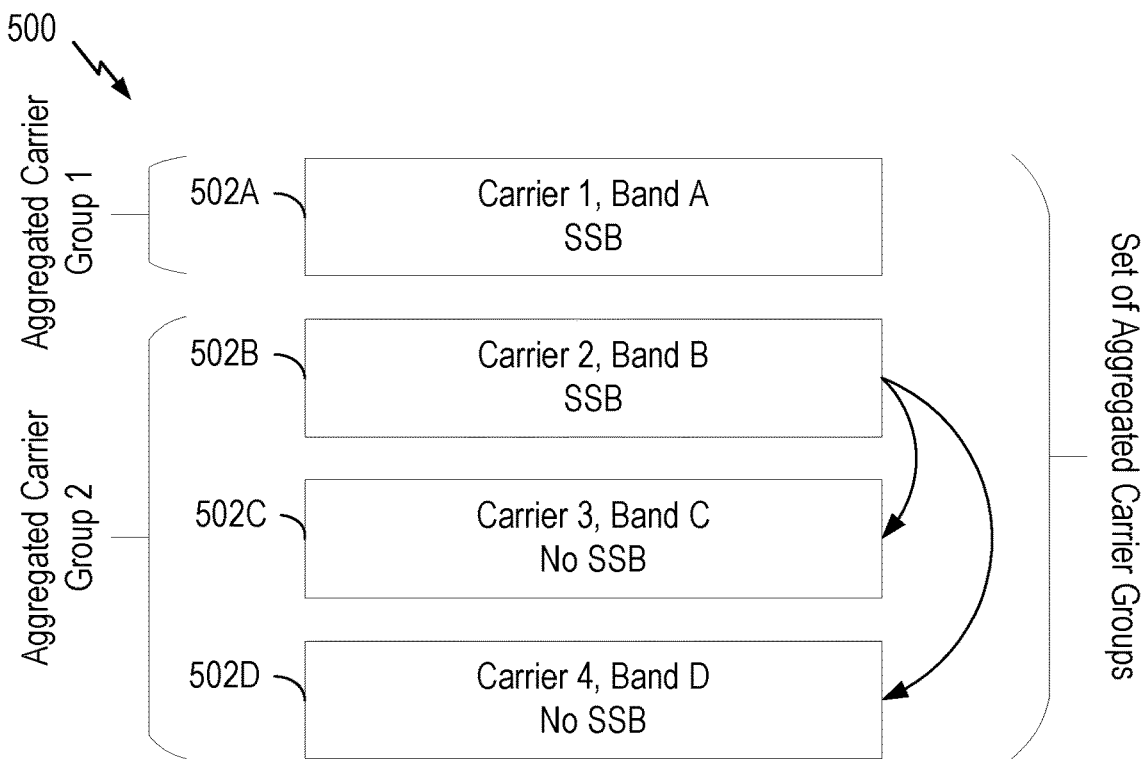
FIGS. 5A and 5B depict examples of aggregated carrier groups with anchor carriers.

FIG. 5A depicts an example of a set of inter-band aggregated carrier groups 500, including two aggregated carrier groups, which may be configured for a user equipment by a network.

Generally, an aggregated carrier group may include one or more carriers wherein at least one carrier is configured for SSB and/or SI broadcasts. In this example, the first aggregated carrier group includes first carrier 502A on band A, and the second aggregated carrier group includes second carrier 502B on band B, third carrier 502C on band C, and fourth carrier 502D on band D. Further, in this example, first carrier 502A and second carrier 502B are carriers configured with SSB broadcasts, while third carrier 502C and fourth carrier 502D are not configured with SSB broadcasts, and thus may be described as "SSB-less carriers."

As depicted by the arrows in FIG. 5A, in this example, second carrier 502B is configured as a reference or "anchor" carrier for third carrier 502C and fourth carrier 502D. In some aspects, an anchor carrier may serve as the serving cell for a user equipment. As such, a user equipment communicating using carrier aggregation on third carrier 502C and fourth carrier 502D may use second carrier 502B as a reference carrier for timing and frequency information (e.g., via receiving SSBs and/or other SI).

In some aspects, the carrier within an aggregated carrier group configured for SSB broadcasts may be in a predefined location (e.g., an ordinal location) within a list of carriers in the group, such as the first carrier in the group. Note that other predefined locations are possible, such as the nth carrier in a group, or the last carrier in a group, and the like. Generally, a carrier aggregation configuration may include an indication of which carrier in an aggregated carrier group is the anchor carrier.

In some aspects, carriers in an aggregated carrier group may be on neighboring bands (e.g., as defined by a standard, such as 3GPP), and a configuration of a set of aggregated carrier groups may list the carriers in an order of bands, such as from lowest frequency to highest, or vice versa.

Figure 5B:
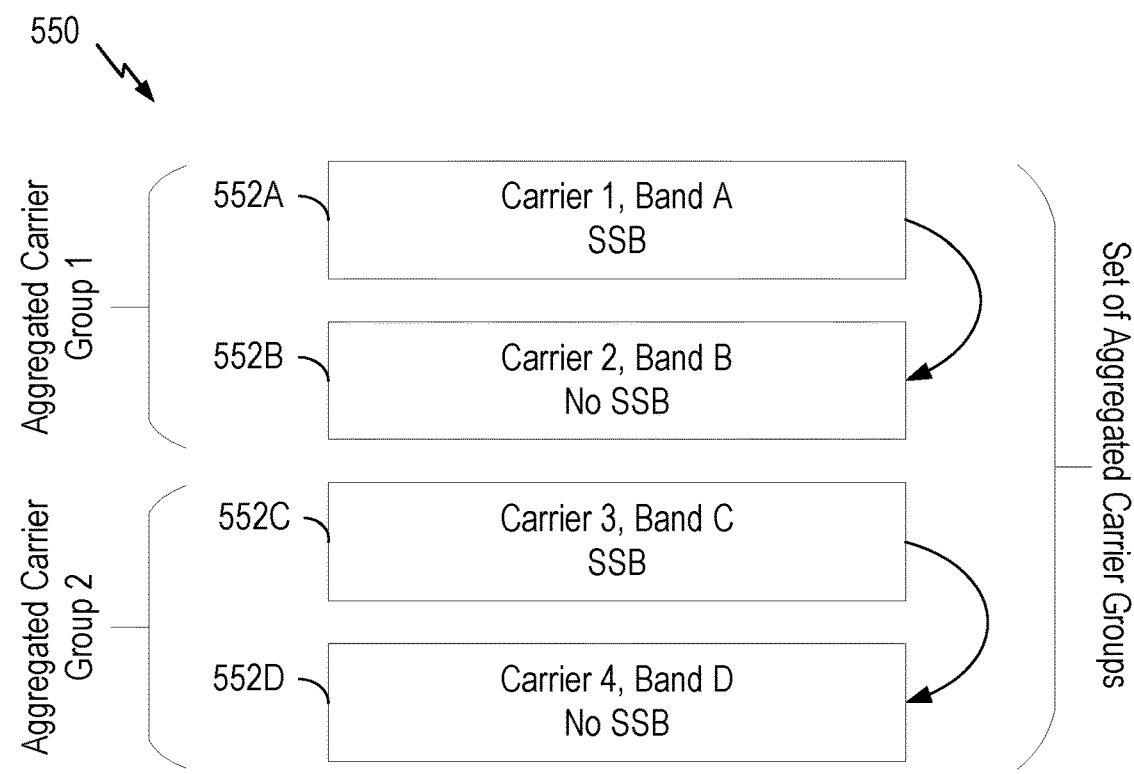

FIG. 5B depicts another example of a set of inter-band aggregated carrier groups 550, which includes first carrier 552A on band A, second carrier 552B on band B, third carrier 552C on band C, and fourth carrier 552D on band D. Further, in this example, first carrier 552A and third carrier 552C are carriers configured for SSB broadcasts, while second carrier 552B and fourth carrier 552D are not configured for SSB broadcasts.

In the set of inter-band aggregated carrier groups 550, there are again two groups (or subsets of carriers), one that includes first carrier 552A and second carrier 552B, and another that includes third carrier 552C and fourth carrier 552D. Thus, here again, each aggregated carrier group includes only one carrier that is configured for SSB broadcasts.

Further in this example, first carrier 552A is configured as an anchor carrier for second carrier 552B, and third carrier 552C is configured as an anchor carrier for fourth carrier 552D. As such, a user equipment communicating using carrier aggregation on first carrier 552A and second carrier 552B may use first carrier 552A as an anchor carrier for timing and frequency information (e.g., via receiving SSBs and/or other SI). Thus, as with the example in FIG. 5A, in this example the carrier configured with the SSB broadcast is the first carrier in a list of carriers in each aggregated carrier group, but as above, other options are possible.

Initial Access on Aggregated Carriers with no Synchronization Signal Block

In some aspects, in order to support an initial access procedure, such as a random access channel (RACH) procedure, on carriers without configured SSBs, a set of aggregated carrier groups may be indicated by a network in SI, such as in a system information block-1 (SIB1). This allows for performing an initial access procedure using aggregated carriers, such as depicted in the example 600 of FIG. 6A. A benefit of performing initial access using aggregated carriers is reducing the chance of collisions, especially for MSG1/PRACH, since a user equipment using aggregated carriers can be directed to transmit PRACH in any one of a plurality of configured (and aggregated) carriers (e.g., component carriers).

Figure 6A:
FIGS. 6A and 6B depict aspects related to an initial access procedure with inter-band aggregated carriers.

In particular, in FIG. 6A, a first message (MSG1) of a RACH procedure is communicating using second carrier 602B, which is a carrier without a configured SSB. Then, a second message (MSG2) is communicated using first carrier 602B, which is a carrier with a configured SSB. Subsequently, in this example, a third message (MSG3) is communicated suing second carrier 602B and a fourth message (MSG4) is communicated using first carrier 602A. Thus, the RACH procedure is carried out using an inter-band aggregated carrier group.

Figure 6B:
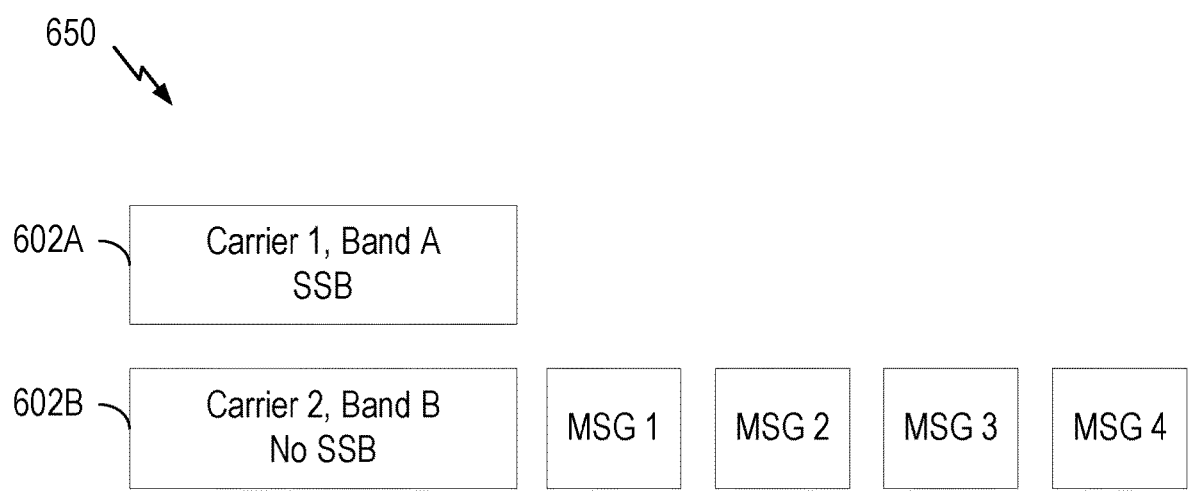

In other aspects, carriers without configured SSBs may be used for an entire initial access procedure, such as RACH. For example, as depicted in example 650 of FIG. 6B, all four messages of a RACH procedure are communicated using second carrier 602B, which is not configured for SSB broadcasts.

In some aspects, a set of aggregated carrier groups may be indicated in SI for performing a RACH on SSB-less carriers (such as in the example 650 of FIG. 6B), but a user equipment may determine its serving cell is on a carrier that is not grouped with any SSB-less carriers. For example, referring back to FIG. 5A, the user equipment's serving cell may be on first carrier 502A, which is not grouped with any other SSB-less carrier. In such a scenario, the user equipment may be configured to respond in different ways.

For example, in such a scenario, the user equipment may be configured to not perform the RACH procedure on other bands in the aggregated carrier group (e.g., on carriers 502B-502D in FIG. 5A), and the network may not expect the user equipment to perform the RACH on other bands in the aggregated carrier group.

As another example, the user equipment may be configured to perform the RACH procedure on other carriers in the aggregated carrier group, even if the serving cell is on a carrier that is not in a group with any SSB-less carriers. In some aspects, this option may be subject to the user equipment's capability of performing RACH on other carriers in the set of aggregated carrier groups, which may in some aspects be indicated by the user equipment via selection of an associated RACH occasion or in a PRACH preamble.

Example Operations of Entities in a Communications Network

Figure 7:
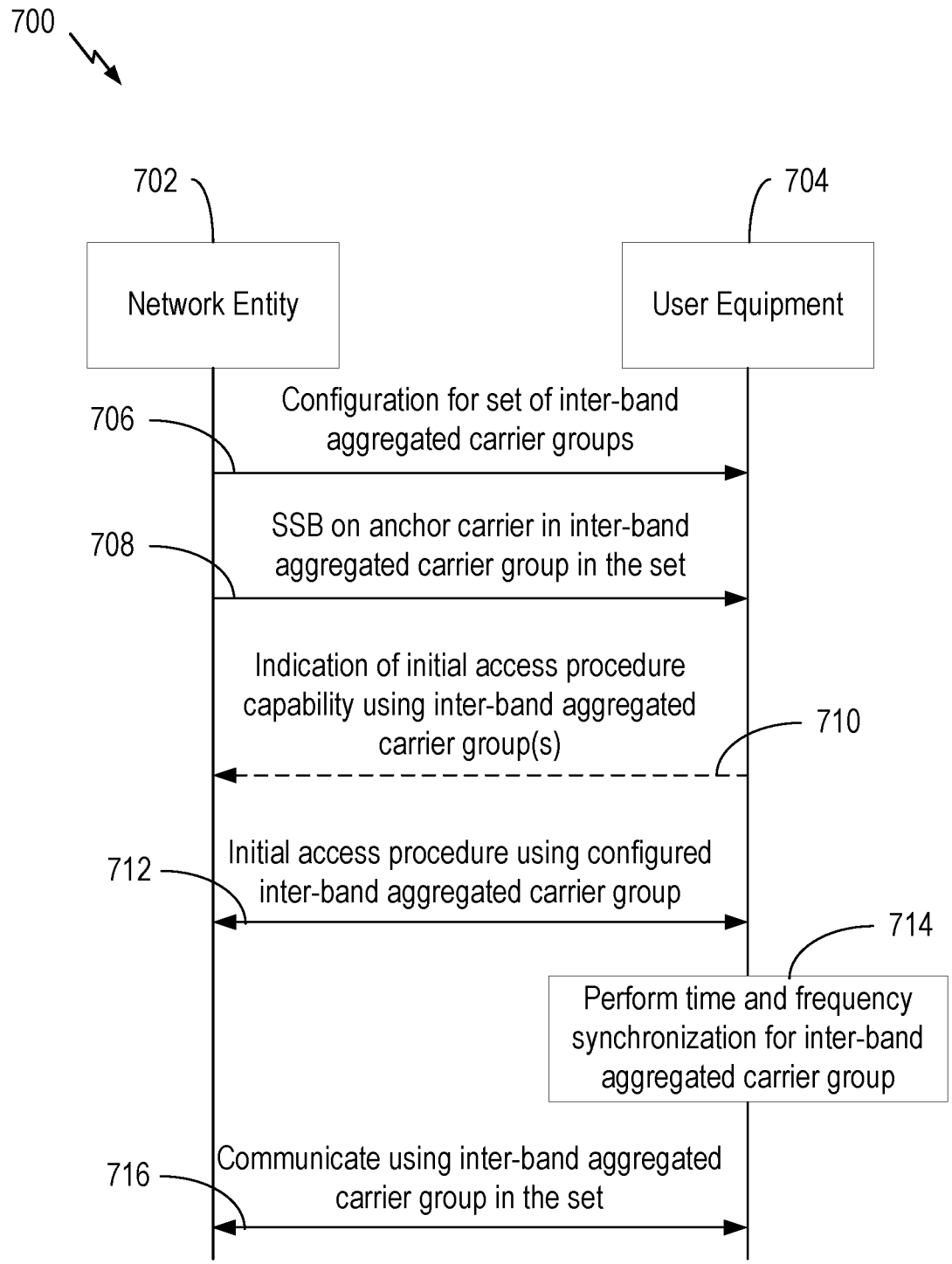
FIG. 7 depicts a process flow for communications in a network between a user equipment and a network entity.

FIG. 7 depicts a process flow 700 for communications in a network between a network entity 702, a user equipment (UE) 704. In some aspects, the network entity 702 may be an example of the BS 102 depicted and described with respect to FIGS. 1 and 3 or a disaggregated base station depicted and described with respect to FIG. 2. Similarly, the UE 704 may be an example of UE 104 depicted and described with respect to FIGS. 1 and 3. However, in other aspects, UE 104 may be another type of wireless communications device and BS 102 may be another type of network entity or network node, such as those described herein.

Flow 700 begins at step 706 with network entity 702 sending to user equipment 704 a configuration for a set of inter-band aggregated carrier groups, such as described with respect to FIGS. 5A and 5B as of above, the set of inter-band aggregated carrier groups may comprise a plurality of groups, and in some aspects, each group may consist of a single anchor carrier configured for SSB broadcasts (e.g., a single carrier comprising an SSB).

Flow 700 then proceeds to step 708 with network entity 702 transmitting an SSB on an anchor carrier of an inter-band aggregated carrier group and user equipment 704 receiving the SSB.

Flow 700 then proceeds to step 710 with user equipment 704 optionally indicating its capability to user different inter-band aggregated carrier group(s) to perform an initial access procedure. For example, as described above, the indication may inform the network of user equipment 704's capability to perform a RACH procedure using SSB-less carriers. In some aspects, the indication may be implicit, such as by choosing a particular RACH occasion with which to send the indication, or to initiate the RACH procedure, or it may be explicit, such as included within a PRACH preamble.

Flow 700 then proceeds to step 712 with network entity 702 and user equipment 704 performing an initial access procedure, such as a RACH procedure. In some aspects, the initial access procedure may be performed using more than one carrier in an inter-band aggregated carrier group, such as described with respect to FIG. 6A, while in others it may be performed using a single carrier in an inter-band aggregated carrier group, including a carrier configured for SSB, or a carrier configured with no SSB as described with respect to FIG. 6B.

Flow 700 then proceeds to step 714 with user equipment 704 performing a time and frequency synchronization procedure based on the received SSB. As above, user equipment 704 may use the time and frequency synchronization data for both the anchor carrier and one or more other carriers in the inter-band aggregated carrier group.

Flow 700 then proceeds to step 716 with user equipment 704 and network entity 702 communicating user one or more carriers in the inter-band aggregated carrier group.

Note that FIG. 7 is just one example of a process flow, and other flows including fewer, additional, or alternative steps are possible consistent with this disclosure.

Example Operations of a User Equipment

Figure 8:
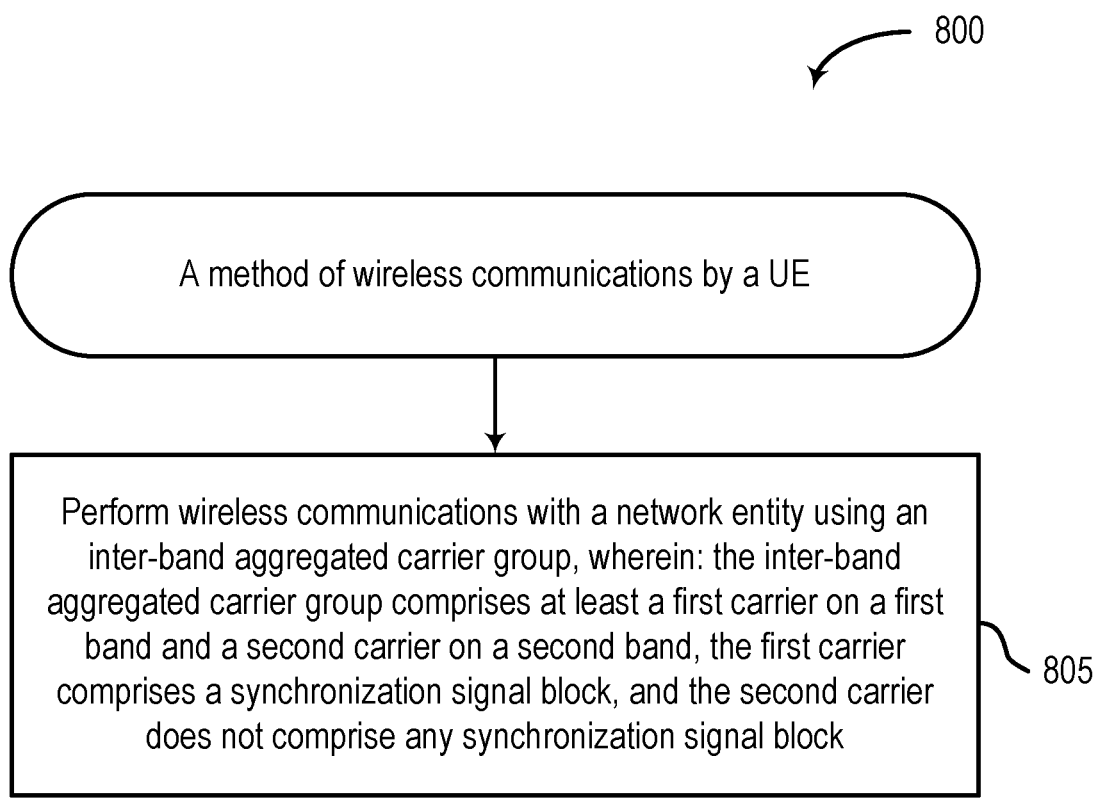
FIG. 8 depicts a method for wireless communications.

FIG. 8 shows an example of a method 800 for wireless communications by a UE, such as UE 104 of FIGS. 1 and 3.

Method 800 begins at step 805 with performing wireless communications with a network entity using an inter-band aggregated carrier group. In some aspects, the inter-band aggregated carrier group comprises at least a first carrier on a first band and a second carrier on a second band, the first carrier comprises a synchronization signal block, and the second carrier does not comprise any synchronization signal block. In some cases, the operations of this step refer to, or may be performed by, circuitry for performing and/or code for performing as described with reference to FIG. 10.

In some aspects, the method 800 further includes receiving, from the network entity, a configuration for a set of inter-band aggregated carrier groups, including the inter-band aggregated carrier group comprising the first carrier and the second carrier. In some cases, the operations of this step refer to, or may be performed by, circuitry for receiving and/or code for receiving as described with reference to FIG. 10.

In some aspects, each respective inter-band aggregated carrier group of the set of inter-band aggregated carrier groups includes: a list of carriers within the respective inter-band aggregated carrier group a single carrier in the list of carriers comprising a synchronization signal block an indication of an ordinal position of the single carrier comprising the synchronization signal block within the list of carriers.

In some aspects, for at least one inter-band aggregated carrier group of the set of inter-band aggregated carrier groups, the ordinal position of the single carrier comprising the synchronization signal block within the list of carriers is a predefined position in the list of carriers. In some aspects, the predefined position in the list of carriers comprises a first position in the list of carriers.

In some aspects, the method 800 further includes receiving, from the network entity, system information configuring a RACH procedure for an inter-band aggregated carrier group of the set of inter-band aggregated carrier groups comprising at least one carrier with no synchronization signal block. In some cases, the operations of this step refer to, or may be performed by, circuitry for receiving and/or code for receiving as described with reference to FIG. 10.

In some aspects, the method 800 further includes determining that a serving cell for the UE is in an inter-band aggregated carrier group, of the set of inter-band aggregated carrier groups, that consists of carriers with synchronization signal blocks. In some cases, the operations of this step refer to, or may be performed by, circuitry for determining and/or code for determining as described with reference to FIG. 10.

In some aspects, the method 800 further includes determining to not perform the RACH procedure. In some cases, the operations of this step refer to, or may be performed by, circuitry for determining and/or code for determining as described with reference to FIG. 10.

In some aspects, the method 800 further includes determining to perform the RACH procedure using another inter-band aggregated carrier group of the set of inter-band aggregated carrier groups, wherein the other inter-band aggregated carrier group comprises at least one carrier that does not comprise any synchronization signal block. In some cases, the operations of this step refer to, or may be performed by, circuitry for determining and/or code for determining as described with reference to FIG. 10.

In some aspects, the method 800 further includes indicating, to the network entity, a capability of the user equipment to perform the RACH procedure using another inter-band aggregated carrier group via at least one of: using a specific RACH occasion associated with the capability to perform the RACH procedure or sending a PRACH preamble indicating the capability. In some cases, the operations of this step refer to, or may be performed by, circuitry for indicating and/or code for indicating as described with reference to FIG. 10.

In some aspects, the configuration further indicates a frequency location of the first carrier and/or the second carrier.

In some aspects, the method 800 further includes receiving, from the network entity, the configuration for the set of inter-band aggregated carrier groups via a system information block or radio resource control (RRC) signaling. For example, a system information block may be useful when a UE performs RACH for initial access, and RRC signaling may be good for other scenarios, such as link or beam failure recovery. In some cases, the operations of this step refer to, or may be performed by, circuitry for receiving and/or code for receiving as described with reference to FIG. 10.

In some aspects, the method 800 further includes performing time and frequency tracking based on an SSB transmitted in the first carrier. In some cases, the operations of this step refer to, or may be performed by, circuitry for generating and/or code for generating as described with reference to FIG. 10.

In some aspects, the method 800 further includes communicating with a network entity over the second carrier based on a tracked time and frequency. In some cases, the operations of this step refer to, or may be performed by, circuitry for communicating and/or code for communicating as described with reference to FIG. 10.

In some aspects, the method 800 further includes performing a RACH procedure with the network entity, wherein at least one message of the RACH procedure is communicated using the first carrier, and wherein at least one other message of the RACH procedure is communicated using the second carrier. In some cases, the operations of this step refer to, or may be performed by, circuitry for performing and/or code for performing as described with reference to FIG. 10.

In some aspects, the method 800 further includes performing a RACH procedure with the network entity, wherein all messages of the RACH procedure are communicated using the second carrier. In some cases, the operations of this step refer to, or may be performed by, circuitry for performing and/or code for performing as described with reference to FIG. 10.

Figure 10:
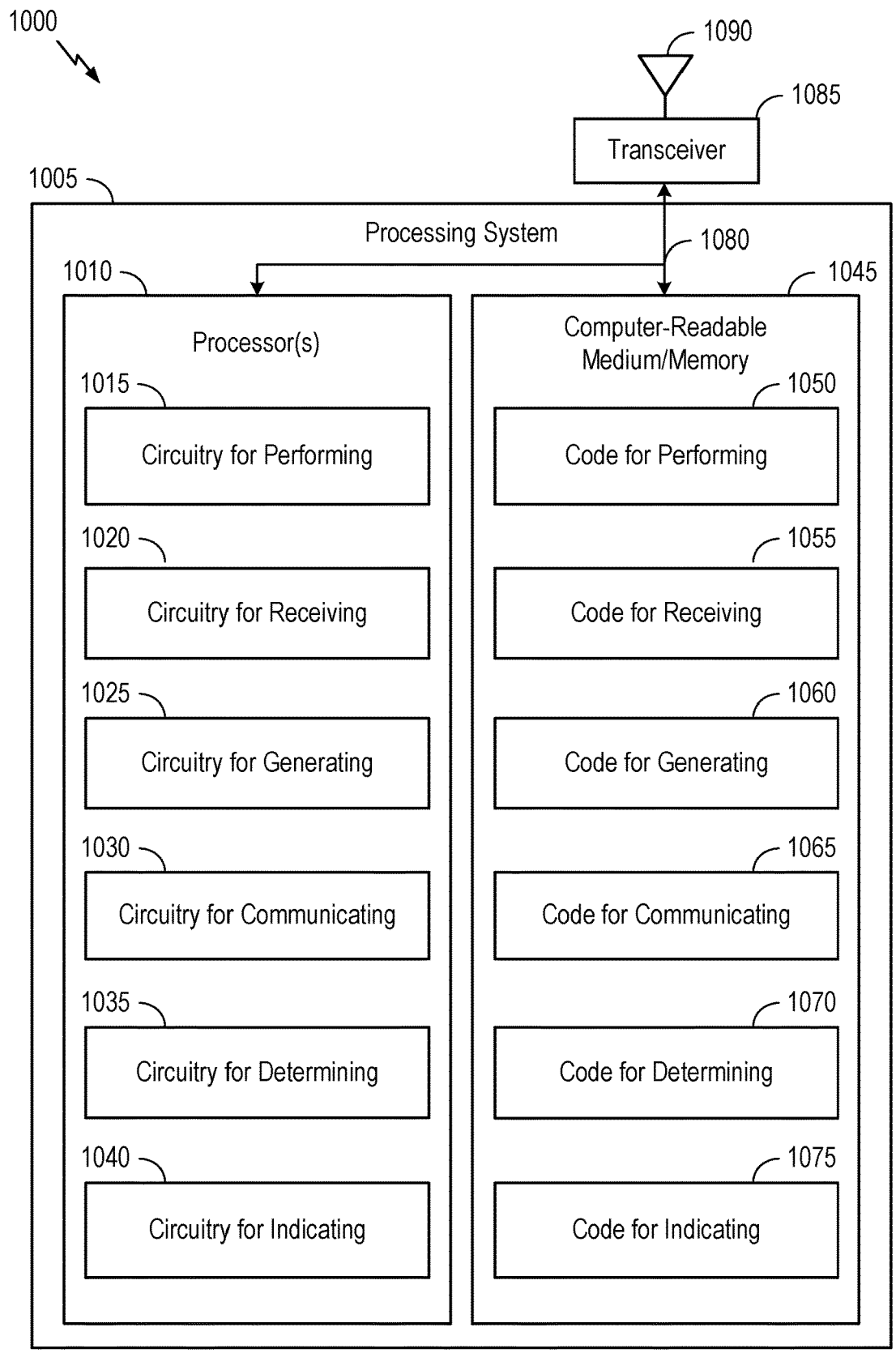
FIG. 10 depicts aspects of an example communications device.

In one aspect, method 800, or any aspect related to it, may be performed by an apparatus, such as communications device 1000 of FIG. 10, which includes various components operable, configured, or adapted to perform the method 800. Communications device 1000 is described below in further detail.

Note that FIG. 8 is just one example of a method, and other methods including fewer, additional, or alternative steps are possible consistent with this disclosure.

Example Operations of a Network Entity

Figure 9:
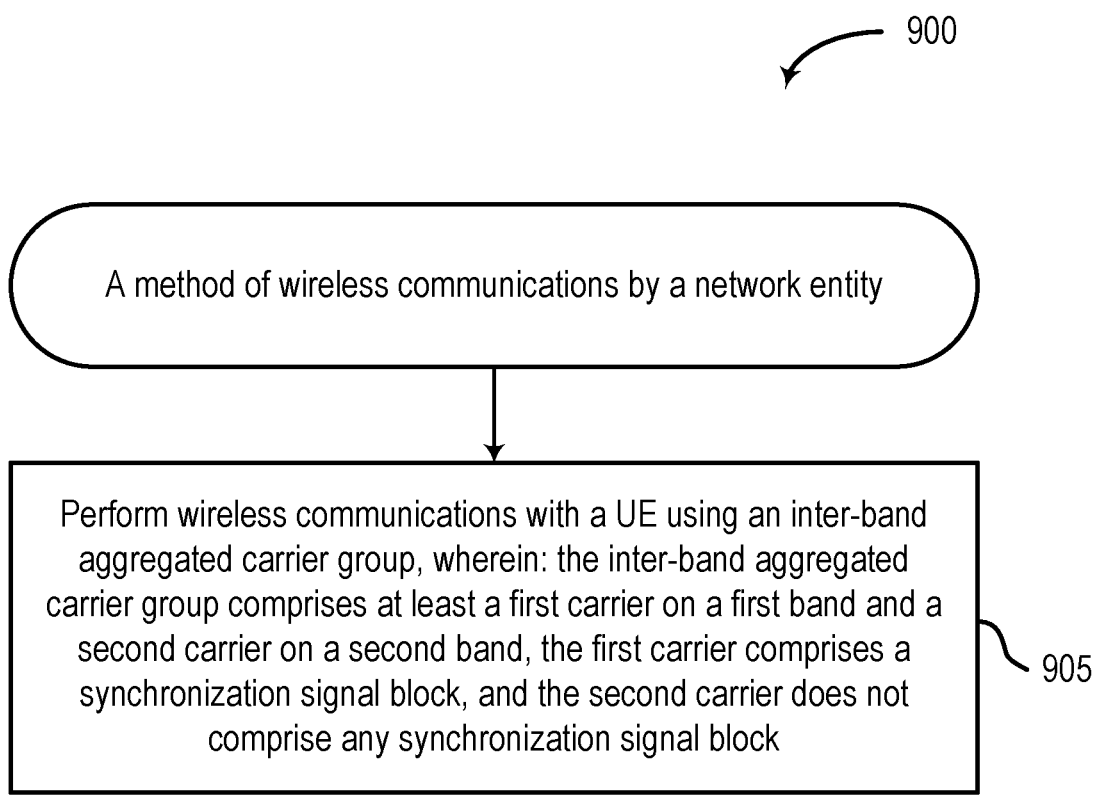
FIG. 9 depicts another method for wireless communications.

FIG. 9 shows an example of a method 900 for wireless communications by a network entity, such as BS 102 of FIGS. 1 and 3, or a disaggregated base station as discussed with respect to FIG. 2.

Method 900 begins at step 905 with performing wireless communications with a UE using an inter-band aggregated carrier group. In some aspects, the inter-band aggregated carrier group comprises at least a first carrier on a first band and a second carrier on a second band, the first carrier comprises a synchronization signal block, and the second carrier does not comprise any synchronization signal block. In some cases, the operations of this step refer to, or may be performed by, circuitry for performing and/or code for performing as described with reference to FIG. 11.

In some aspects, the method 900 further includes sending, to the UE, a configuration for a set of inter-band aggregated carrier groups, including the inter-band aggregated carrier group comprising the first carrier and the second carrier. In some cases, the operations of this step refer to, or may be performed by, circuitry for sending and/or code for sending as described with reference to FIG. 11.

In some aspects, each respective inter-band aggregated carrier group of the set of inter-band carrier groups includes: a list of carriers within the respective inter-band aggregated carrier group a single carrier in the list of carriers comprising a synchronization signal block an indication of an ordinal position of the single carrier comprising the synchronization signal block within the list of carriers.

In some aspects, for at least one inter-band aggregated carrier group of the set of inter-band aggregated carrier groups, the ordinal position of the single carrier comprising the synchronization signal block within the list of carriers is a predefined position in the list of carriers. In some aspects, the predefined position in the list of carriers comprises a first position in the list of carriers.

In some aspects, the method 900 further includes sending, to the UE, system information configuring a RACH procedure for an inter-band aggregated carrier group of the set of inter-band aggregated carrier groups comprising at least one carrier with no synchronization signal block. In some cases, the operations of this step refer to, or may be performed by, circuitry for sending and/or code for sending as described with reference to FIG. 11.

In some aspects, the method 900 further includes performing the RACH procedure using another inter-band aggregated carrier group of the set of inter-band aggregated carrier groups, wherein the other inter-band aggregated carrier group comprises at least one carrier that does not comprise any synchronization signal block. In some cases, the operations of this step refer to, or may be performed by, circuitry for performing and/or code for performing as described with reference to FIG. 11.

In some aspects, the configuration further indicates a frequency location of the first carrier and/or the second carrier.

In some aspects, the method 900 further includes sending, to the UE, the configuration for the set of inter-band aggregated carrier groups via a system information block. In some cases, the operations of this step refer to, or may be performed by, circuitry for sending and/or code for sending as described with reference to FIG. 11.

In some aspects, the method 900 further includes performing a time and frequency synchronization procedure with the UE using the first carrier. In some cases, the operations of this step refer to, or may be performed by, circuitry for performing and/or code for performing as described with reference to FIG. 11.

In some aspects, the method 900 further includes performing a RACH procedure with the UE, wherein at least one message of the RACH procedure is communicated using the first carrier, and wherein at least one other message of the RACH procedure is communicated using the second carrier. In some cases, the operations of this step refer to, or may be performed by, circuitry for performing and/or code for performing as described with reference to FIG. 11.

In some aspects, the method 900 further includes performing a RACH procedure with the UE, wherein all messages of the RACH procedure are communicated using the second carrier. In some cases, the operations of this step refer to, or may be performed by, circuitry for performing and/or code for performing as described with reference to FIG. 11.

Figure 11:
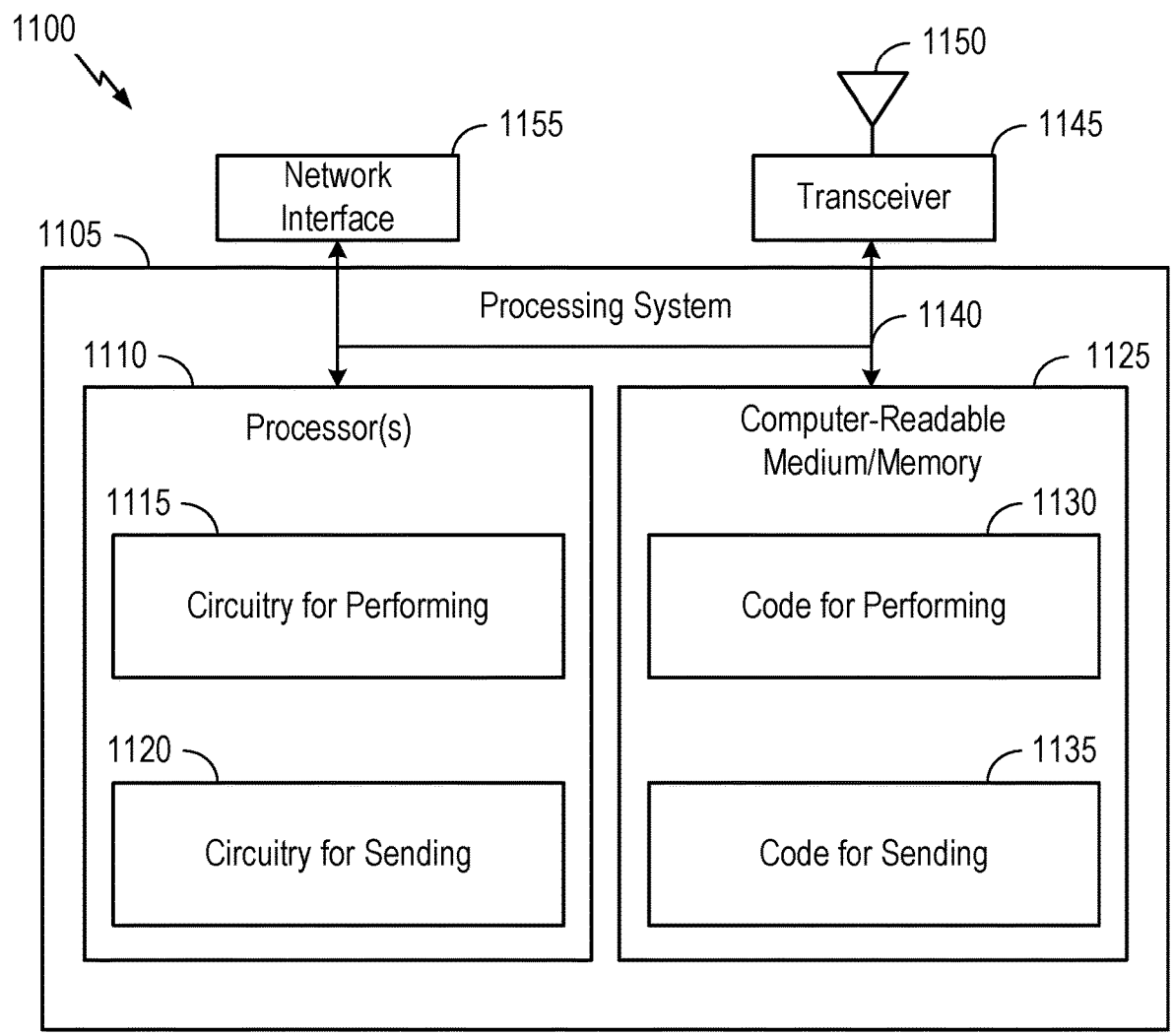
FIG. 11 depicts aspects of another example communications device.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Example Communications Devices

FIG. 10 depicts aspects of an example communications device 1000. In some aspects, communications device 1000 is a user equipment, such as UE 104 described above with respect to FIGS. 1 and 3.

The communications device 1000 includes a processing system 1005 coupled to the transceiver 1085 (e.g., a transmitter and/or a receiver). The transceiver 1085 is configured to transmit and receive signals for the communications device 1000 via the antenna 1090, such as the various signals as described herein. The processing system 1005 may be configured to perform processing functions for the communications device 1000, including processing signals received and/or to be transmitted by the communications device 1000.

The processing system 1005 includes one or more processors 1010. In various aspects, the one or more processors 1010 may be representative of one or more of receive processor 358, transmit processor 364, TX MIMO processor 366, and/or controller/processor 380, as described with respect to FIG. 3. The one or more processors 1010 are coupled to a computer-readable medium/memory 1045 via a bus 1080. In certain aspects, the computer-readable medium/memory 1045 is configured to store instructions (e.g., computer-executable code) that when executed by the one or more processors 1010, cause the one or more processors 1010 to perform the method 800 described with respect to FIG. 8, or any aspect related to it. Note that reference to a processor performing a function of communications device 1000 may include one or more processors 1010 performing that function of communications device 1000.

In the depicted example, computer-readable medium/memory 1045 stores code (e.g., executable instructions), such as code for performing 1050, code for receiving 1055, code for generating 1060, code for communicating 1065, code for determining 1070, and code for indicating 1075. Processing of the code for performing 1050, code for receiving 1055, code for generating 1060, code for communicating 1065, code for determining 1070, and code for indicating 1075 may cause the communications device 1000 to perform the method 800 described with respect to FIG. 8, or any aspect related to it.

The one or more processors 1010 include circuitry configured to implement (e.g., execute) the code stored in the computer-readable medium/memory 1045, including circuitry such as circuitry for performing 1015, circuitry for receiving 1020, circuitry for generating 1025, circuitry for communicating 1030, circuitry for determining 1035, and circuitry for indicating 1040. Processing with circuitry for performing 1015, circuitry for receiving 1020, circuitry for generating 1025, circuitry for communicating 1030, circuitry for determining 1035, and circuitry for indicating 1040 may cause the communications device 1000 to perform the method 800 described with respect to FIG. 8, or any aspect related to it.

Various components of the communications device 1000 may provide means for performing the method 800 described with respect to FIG. 8, or any aspect related to it. For example, means for transmitting, sending or outputting for transmission may include transceivers 354 and/or antenna(s) 352 of the UE 104 illustrated in FIG. 3 and/or the transceiver 1085 and the antenna 1090 of the communications device 1000 in FIG. Means for receiving or obtaining may include transceivers 354 and/or antenna(s) 352 of the UE 104 illustrated in FIG. 3 and/or the transceiver 1085 and the antenna 1090 of the communications device 1000 in FIG. 10.

FIG. 11 depicts aspects of an example communications device 1100. In some aspects, communications device 1100 is a network entity, such as BS 102 of FIGS. 1 and 3, or a disaggregated base station as discussed with respect to FIG. 2.

The communications device 1100 includes a processing system 1105 coupled to the transceiver 1145 (e.g., a transmitter and/or a receiver) and/or a network interface 1155. The transceiver 1145 is configured to transmit and receive signals for the communications device 1100 via the antenna 1150, such as the various signals as described herein. The network interface 1155 is configured to obtain and send signals for the communications device 1100 via communication link(s), such as a backhaul link, midhaul link, and/or fronthaul link as described herein, such as with respect to FIG. 2. The processing system 1105 may be configured to perform processing functions for the communications device 1100, including processing signals received and/or to be transmitted by the communications device 1100.

The processing system 1105 includes one or more processors 1110. In various aspects, one or more processors 1110 may be representative of one or more of receive processor 338, transmit processor 320, TX MIMO processor 330, and/or controller/processor 340, as described with respect to FIG. 3. The one or more processors 1110 are coupled to a computer-readable medium/memory 1125 via a bus 1140. In certain aspects, the computer-readable medium/memory 1125 is configured to store instructions (e.g., computer-executable code) that when executed by the one or more processors 1110, cause the one or more processors 1110 to perform the method 900 described with respect to FIG. 9, or any aspect related to it. Note that reference to a processor of communications device 1100 performing a function may include one or more processors 1110 of communications device 1100 performing that function.

In the depicted example, the computer-readable medium/ memory 1125 stores code (e.g., executable instructions), such as code for performing 1130 and code for sending 1135. Processing of the code for performing 1130 and code for sending 1135 may cause the communications device 1100 to perform the method 900 described with respect to FIG. 9, or any aspect related to it.

The one or more processors 1110 include circuitry configured to implement (e.g., execute) the code stored in the computer-readable medium/memory 1125, including circuitry such as circuitry for performing 1115 and circuitry for sending 1120. Processing with circuitry for performing 1115 and circuitry for sending 1120 may cause the communications device 1100 to perform the method 900 as described with respect to FIG. 9, or any aspect related to it.

Various components of the communications device 1100 may provide means for performing the method 900 as described with respect to FIG. 9, or any aspect related to it. Means for transmitting, sending or outputting for transmission may include transceivers 332 and/or antenna(s) 334 of the BS 102 illustrated in FIG. 3 and/or the transceiver 1145 and the antenna 1150 of the communications device 1100 in FIG. 11. Means for receiving or obtaining may include transceivers 332 and/or antenna(s) 334 of the BS 102 illustrated in FIG. 3 and/or the transceiver 1145 and the antenna 1150 of the communications device 1100 in FIG. 11.

EXAMPLE CLAUSES

Implementation examples are described in the following numbered clauses:

Clause 1: A method of wireless communications by a user equipment (UE), comprising: performing wireless communications with a network entity using an inter-band aggregated carrier group, wherein: the inter-band aggregated carrier group comprises at least a first carrier on a first band and a second carrier on a second band, the first carrier comprises a synchronization signal block, and the second carrier does not comprise any synchronization signal block.

Clause 2: The method of Clause 1, further comprising receiving, from the network entity, a configuration for a set of inter-band aggregated carrier groups, including the inter-band aggregated carrier group comprising the first carrier and the second carrier.

Clause 3: The method of Clause 2, wherein: each respective inter-band aggregated carrier group of the set of inter-band aggregated carrier groups includes: a list of carriers within the respective inter-band aggregated carrier group; a single carrier in the list of carriers comprising a synchronization signal block; and an indication of an ordinal position of the single carrier comprising the synchronization signal block within the list of carriers.

Clause 4: The method of Clause 3, wherein for at least one inter-band aggregated carrier group of the set of inter-band aggregated carrier groups, the ordinal position of the single carrier comprising the synchronization signal block within the list of carriers is a predefined position in the list of carriers.

Clause 5: The method of Clause 4, wherein the predefined position in the list of carriers comprises a first position in the list of carriers.

Clause 6: The method of any one of Clauses 2-5, wherein the configuration further indicates a frequency location of the first carrier.

Clause 7: The method of any one of Clauses 1-6, further comprising: performing time and frequency tracking based on an SSB transmitted in the first carrier; and communicating with a network entity over the second carrier based on a tracked time and frequency.

Clause 8: The method of any one of Clauses 1-7, further comprising: performing a random access channel (RACH) procedure with the network entity, wherein at least one message of the RACH procedure is communicated using the first carrier, and wherein at least one other message of the RACH procedure is communicated using the second carrier.

Clause 9: The method of any one of Clauses 1-8, further comprising: performing a random access channel (RACH) procedure with the network entity, wherein all messages of the RACH procedure are communicated using the second carrier.

Clause 10: The method of any one of Clauses 2-9, further comprising receiving, from the network entity, the configuration for the set of inter-band aggregated carrier groups via a system information block or radio resource control (RRC) signaling.

Clause 11: The method of any one of Clauses 3-10, further comprising: receiving, from the network entity, system information configuring a random access channel (RACH) procedure for an inter-band aggregated carrier group of the set of inter-band aggregated carrier groups comprising at least one carrier with no synchronization signal block; and determining that a serving cell for the UE is in an inter-band aggregated carrier group, of the set of inter-band aggregated carrier groups, that consists of carriers with synchronization signal blocks.

Clause 12: The method of Clause 11, further comprising determining to not perform the RACH procedure.

Clause 13: The method of Clause 11, further comprising: determining to perform the RACH procedure using another inter-band aggregated carrier group of the set of inter-band aggregated carrier groups, wherein the other inter-band aggregated carrier group comprises at least one carrier that does not comprise any synchronization signal block.

Clause 14: The method of Clause 13, further comprising indicating, to the network entity, a capability of the user equipment to perform the RACH procedure using another inter-band aggregated carrier group via at least one of: using a specific RACH occasion associated with the capability to perform the RACH procedure or sending a physical random access channel (PRACH) preamble indicating the capability.

Clause 15: A method of wireless communications by a network entity, comprising: performing wireless communications with a user equipment (UE) using an inter-band aggregated carrier group, wherein: the inter-band aggregated carrier group comprises at least a first carrier on a first band and a second carrier on a second band, the first carrier comprises a synchronization signal block, and the second carrier does not comprise any synchronization signal block.

Clause 16: The method of Clause 15, further comprising sending, to the UE, a configuration for a set of inter-band aggregated carrier groups, including the inter-band aggregated carrier group comprising the first carrier and the second carrier.

Clause 17: The method of Clause 16, wherein each respective inter-band aggregated carrier group of the set of inter-band carrier groups includes: a list of carriers within the respective inter-band aggregated carrier group; a single carrier in the list of carriers comprising a synchronization signal block; and an indication of an ordinal position of the single carrier comprising the synchronization signal block within the list of carriers.

Clause 18: The method of Clause 17, wherein for at least one inter-band aggregated carrier group of the set of inter-band aggregated carrier groups, the ordinal position of the single carrier comprising the synchronization signal block within the list of carriers is a predefined position in the list of carriers.

Clause 19: The method of Clause 18, wherein the predefined position in the list of carriers comprises a first position in the list of carriers.

Clause 20: The method of any one of Clauses 15-19, wherein the configuration further indicates a frequency location of the first carrier.

Clause 21: The method of any one of Clauses 15-20, further comprising performing a time and frequency synchronization procedure with the UE using the first carrier.

Clause 22: The method of any one of Clauses 15-21, further comprising: performing a random access channel (RACH) procedure with the UE, wherein at least one message of the RACH procedure is communicated using the first carrier, and wherein at least one other message of the RACH procedure is communicated using the second carrier.

Clause 23: The method of any one of Clauses 15-22, further comprising: performing a random access channel (RACH) procedure with the UE, wherein all messages of the RACH procedure are communicated using the second carrier.

Clause 24: The method of any one of Clauses 16-23, further comprising sending, to the UE, the configuration for the set of inter-band aggregated carrier groups via a system information block.

Clause 25: The method of any one of Clauses 17-24, further comprising sending, to the UE, system information configuring a random access channel (RACH) procedure for an inter-band aggregated carrier group of the set of inter-band aggregated carrier groups comprising at least one carrier with no synchronization signal block.

Clause 26: The method of Clause 25, further comprising: performing the RACH procedure using another inter-band aggregated carrier group of the set of inter-band aggregated carrier groups, wherein the other inter-band aggregated carrier group comprises at least one carrier that does not comprise any synchronization signal block.

Clause 27: An apparatus, comprising: a memory comprising executable instructions; and a processor configured to execute the executable instructions and cause the apparatus to perform a method in accordance with any one of Clauses 1-26.

Clause 28: An apparatus, comprising means for performing a method in accordance with any one of Clauses 1-26.

Clause 29: A non-transitory computer-readable medium comprising executable instructions that, when executed by a processor of an apparatus, cause the apparatus to perform a method in accordance with any one of Clauses 1-26.

Clause 30: A computer program product embodied on a computer-readable storage medium comprising code for performing a method in accordance with any one of Clauses 1-26.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communications by a user equipment (UE), comprising:
   performing wireless communications with a network entity using an inter-band aggregated carrier group, wherein:
      the inter-band aggregated carrier group comprises at least a first carrier on a first band and a second carrier on a second band,
      the first carrier comprises a synchronization signal block, and
      the second carrier does not comprise any synchronization signal block, wherein the method further comprises:
         receiving, from the network entity, a configuration for a set of inter-band aggregated carrier groups, including the inter-band aggregated carrier group comprising the first carrier and the second carrier, wherein the configuration further indicates a frequency location of the first carrier.

2. A method of wireless communications by a user equipment (UE), comprising:
   performing wireless communications with a network entity using an inter-band aggregated carrier group, wherein:
      the inter-band aggregated carrier group comprises at least a first carrier on a first band and a second carrier on a second band,
      the first carrier comprises a synchronization signal block, and
      the second carrier does not comprise any synchronization signal block, wherein the method further comprises:
         receiving, from the network entity, a configuration for a set of inter-band aggregated carrier groups, including the inter-band aggregated carrier group comprising the first carrier and the second carrier, wherein each respective inter-band aggregated carrier group of the set of inter-band aggregated carrier groups includes:
            a list of carriers within the respective inter-band aggregated carrier group;
            a single carrier in the list of carriers comprising a synchronization signal block; and
            an indication of an ordinal position of the single carrier within the list of carriers.

3. The method of claim 2, wherein for at least one inter-band aggregated carrier group of the set of inter-band aggregated carrier groups, the ordinal position of the single carrier within the list of carriers is a predefined position in the list of carriers.

4. The method of claim 3, wherein the predefined position in the list of carriers comprises a first position in the list of carriers.

5. The method of claim 2, comprising:
   receiving, from the network entity, system information configuring a random access channel (RACH) procedure for at least one inter-band aggregated carrier group of the set of inter-band aggregated carrier groups comprising at least one carrier with no synchronization signal block; and
   determining that a serving cell for the UE is in one inter-band aggregated carrier group, of the set of inter-band aggregated carrier groups, that comprises carriers with synchronization signal blocks.

6. The method of claim 5, comprising: determining to not perform the RACH procedure.

7. The method of claim 5, comprising:
   determining to perform the RACH procedure using another inter-band aggregated carrier group of the set of inter-band aggregated carrier groups,
   wherein the other inter-band aggregated carrier group comprises at least one carrier that does not comprise any synchronization signal block.

8. The method of claim 7, comprising: indicating, to the network entity, a capability of the user equipment to perform the RACH procedure using the other inter-band aggregated carrier group via at least one of: using a specific RACH occasion associated with the capability to perform the RACH procedure or sending a physical random access channel (PRACH) preamble indicating the capability.

9. A user equipment (UE) configured for wireless communications, comprising one or more memories comprising computer-executable instructions, and one or more processors configured to execute the computer-executable instructions and cause the UE to:
   perform wireless communications with a network entity using an inter-band aggregated carrier group, wherein:
      the inter-band aggregated carrier group comprises at least a first carrier on a first band and a second carrier on a second band,
      the first carrier comprises a synchronization signal block, and
      the second carrier does not comprise any synchronization signal block,
   wherein the one or more processors are configured to execute the computer-executable instructions and cause the UE to:
      receive, from the network entity, a configuration for a set of inter-band aggregated carrier groups, including the inter-band aggregated carrier group comprising the first carrier and the second carrier, wherein the configuration further indicates a frequency location of the first carrier.

10. A user equipment (UE) configured for wireless communications, comprising one or more memories comprising computer-executable instructions, and one or more processors configured to execute the computer-executable instructions and cause the UE to:

perform wireless communications with a network entity using an inter-band aggregated carrier group, wherein:

the inter-band aggregated carrier group comprises at least a first carrier on a first band and a second carrier on a second band, the first carrier comprises a synchronization signal block, and the second carrier does not comprise any synchronization signal block, wherein the one or more processors are configured to execute the computer-executable instructions and cause the UE to:

receive, from the network entity, a configuration for a set of inter-band aggregated carrier groups, including the inter-band aggregated carrier group comprising the first carrier and the second carrier, wherein each respective inter-band aggregated carrier group of the set of inter-band aggregated carrier groups includes:

a list of carriers within the respective inter-band aggregated carrier group;

a single carrier in the list of carriers comprising a synchronization signal block; and an indication of an ordinal position of the single carrier within the list of carriers.

11. The UE of claim 10, wherein for at least one inter-band aggregated carrier group of the set of inter-band aggregated carrier groups, the ordinal position of the single carrier within the list of carriers is a predefined position in the list of carriers.

12. The UE of claim 11, wherein the predefined position in the list of carriers comprises a first position in the list of carriers.

13. The UE of claim 10, wherein the one or more processors are configured to execute the computer-executable instructions and cause the UE to:

receive, from the network entity, system information configuring a random access channel (RACH) procedure for at least one inter-band aggregated carrier group of the set of inter-band aggregated carrier groups comprising at least one carrier with no synchronization signal block; and determine that a serving cell for the UE is in one inter-band aggregated carrier group, of the set of inter-band aggregated carrier groups, that comprises carriers with synchronization signal blocks.

14. The UE of claim 13, wherein the one or more processors are configured to execute the computer-executable instructions and cause the UE to: determine to not perform the RACH procedure.

15. The UE of claim 13, wherein the one or more processors are configured to execute the computer-executable instructions and cause the UE to:

determine to perform the RACH procedure using another inter-band aggregated carrier group of the set of inter-band aggregated carrier groups, wherein the other inter-band aggregated carrier group comprises at least one carrier that does not comprise any synchronization signal block.

16. The UE of claim 15, wherein the one or more processors are configured to execute the computer-executable instructions and cause the UE to: indicate, to the network entity, a capability of the user equipment to perform the RACH procedure using the other inter-band aggregated carrier group via at least one of: using a specific RACH occasion associated with the capability to perform the RACH procedure or sending a physical random access channel (PRACH) preamble indicating the capability.

* * * * *